(12) United States Patent
Luo et al.

(10) Patent No.: US 10,356,811 B2
(45) Date of Patent: Jul. 16, 2019

(54) METHODS AND APPARATUS FOR GRANT PROCESSING

(71) Applicant: QUALCOMM Incorporated, San Diego, CA (US)

(72) Inventors: Tao Luo, San Diego, CA (US); Peter Pui Lok Ang, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 15/269,743

(22) Filed: Sep. 19, 2016

(65) Prior Publication Data

US 2017/0223728 A1 Aug. 3, 2017

Related U.S. Application Data

(60) Provisional application No. 62/288,428, filed on Jan. 28, 2016.

(51) Int. Cl.
*H04W 72/14* (2009.01)
*H04B 10/516* (2013.01)
(Continued)

(52) U.S. Cl.
CPC .......... *H04W 72/14* (2013.01); *H04B 10/516* (2013.01); *H04L 5/0053* (2013.01); *H04W 52/14* (2013.01); *H04L 5/0051* (2013.01); *H04L 5/1469* (2013.01); *H04W 52/262* (2013.01); *H04W 72/1289* (2013.01)

(58) Field of Classification Search
CPC . H04W 72/1294; H04W 72/14; H04W 52/14; H04W 52/262; H04B 52/174
See application file for complete search history.

(56) References Cited

U.S. PATENT DOCUMENTS

2010/0303034 A1* 12/2010 Chen ..................... H04L 5/0023
370/329
2011/0176435 A1* 7/2011 Khandekar ............... H04L 5/16
370/252
(Continued)

FOREIGN PATENT DOCUMENTS

EP 2869628 A1 5/2015
WO WO-2014196616 A1 12/2014

OTHER PUBLICATIONS

R1-120266, "E-PDCCH Design Considerations on Multiplexing with PDSCH", Feb. 6-10, 2012, pp. 1-4.*
(Continued)

*Primary Examiner* — Salvador E Rivas
(74) *Attorney, Agent, or Firm* — Qualcomm IP Dept.; James Hunt Yancey, Jr.

(57) ABSTRACT

Certain aspects of the present disclosure relate to methods and apparatus for grant processing in uplink centric subframes. An example method generally includes transmitting a first subframe comprising a first grant that includes information for one or more transmissions on that allocated resources in the first subframe to a user equipment (UE) and transmitting the first subframe, with a second grant that allocates resources in at least a second subframe to occur after the first subframe. Other aspects, embodiments, and features are also claimed and described.

27 Claims, 15 Drawing Sheets

(51) Int. Cl.
*H04W 52/14* (2009.01)
*H04L 5/00* (2006.01)
*H04W 52/26* (2009.01)
*H04L 5/14* (2006.01)
*H04W 72/12* (2009.01)

(56) References Cited

U.S. PATENT DOCUMENTS

| | | | |
|---|---|---|---|
| 2012/0009923 A1* | 1/2012 | Chen | H04L 5/0053 455/434 |
| 2013/0028205 A1* | 1/2013 | Damnjanovic | H04L 5/001 370/329 |
| 2014/0036850 A1* | 2/2014 | Akimoto | H04L 5/0017 370/329 |
| 2014/0369293 A1* | 12/2014 | Guo | H04L 5/0073 370/329 |
| 2015/0189648 A1* | 7/2015 | Suzuki | H04W 28/06 370/329 |

OTHER PUBLICATIONS

R1-120266, "E-PDCCH Design Considerations on Multiplexing with PDSCH", Feb. 6-10, 2012, pp. 1-4 (Year: 2012).*
HTC: "E-PDCCH Design Considerations on Multiplexing with PDSCH", 3GPP Draft; R1-120266, 3rd Generation Partnership Project (3GPP), Mobile Competence Centre ; 650, Route Des Lucioles ; F-06921 Sophia-Antipolis Cedex ; France, vol. RAN WG1, No. Dresden, Germany; Feb. 6, 2012-Feb. 10, 2012, Feb. 1, 2012 (Feb. 1, 2012), XP050563176, [retrieved on Feb. 1, 2012].
International Search Report and Written Opinion—PCT/US2016/065211—ISA/EPO—dated Mar. 6, 2017.
LG Electronics: "Further Details on SRS Capacity Improvement Schemes", 3GPP Draft, R1-155398, 3rd Generation Partnership Project (3GPP), Mobile Competence Centre, 650, Route Des Lucioles, F-06921 Sophia-Antipolis Cedex, France, Oct. 4, 2015 (Oct. 4, 2015), XP051002305, 4 pages. Retrieved from the Internet: URL:http://www.3gpp.org/ftp/Meetings_3GPP_SYNC/RAN1/Docs/.
International Preliminary Report on Patentability dated Jul. 31, 2018; PCT/US2016/065211.

* cited by examiner

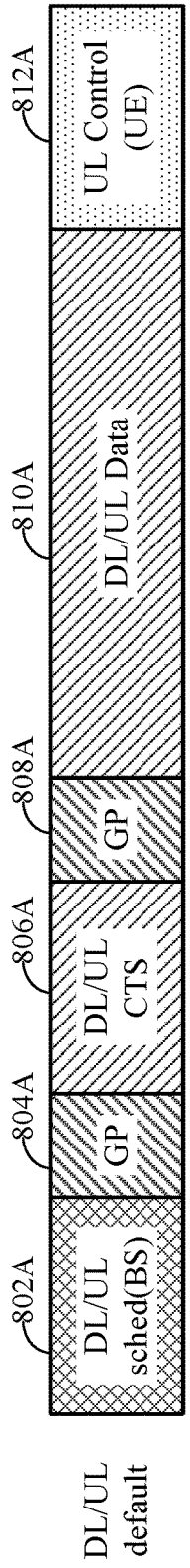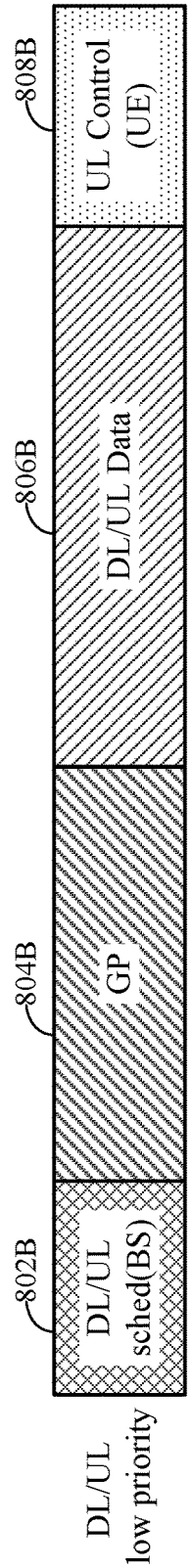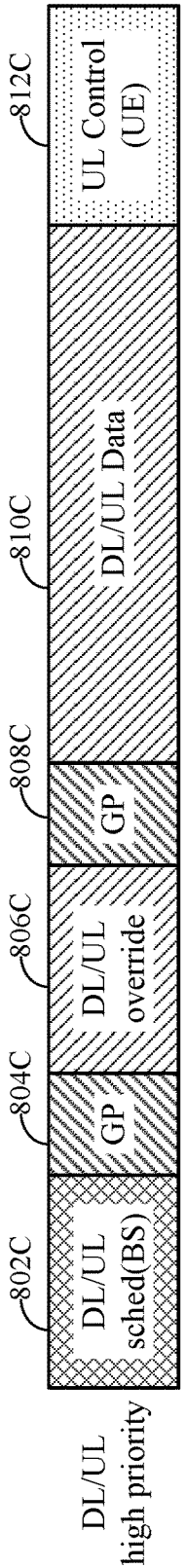

METHODS AND APPARATUS FOR GRANT PROCESSING

CLAIM OF PRIORITY UNDER 35 U.S.C. § 119

This application claims benefit of U.S. Provisional Patent Application Ser. No. 62/288,428, filed Jan. 28, 2016, which is herein incorporated by reference in its entirety

TECHNICAL FIELD

Certain aspects of the present disclosure generally relate to wireless communications, and more particularly, to grant processing in uplink centric subframes. Embodiments enable and provide efficient communication protocols (e.g., link grants) for helping ease processing time (e.g., for downlink and uplink frame/sub-frame processing), improve power conservation, and positively benefit user experience.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Certain aspects of the present disclosure provide a method for wireless communications by a base station. The method generally includes transmitting a first subframe comprising a first grant that includes information for one or more transmissions on allocated resources in the first subframe to a user equipment (UE) and transmitting the first subframe with a second grant that allocates resources in at least a second subframe to occur after the first subframe.

Certain aspects of the present disclosure provide an apparatus for wireless communications by a base station. The apparatus generally includes at least one processor configured to generate a first grant that includes information for one or more transmissions on allocated resources in a first subframe and generate a second grant that allocates resources in at least a second subframe to occur after the first subframe. The apparatus also generally includes a transmitter configured to transmit the first grant and the second grant in the first subframe.

Certain aspects of the present disclosure provide an apparatus for wireless communications by a base station. The apparatus generally includes means for transmitting a first subframe comprising a first grant that includes information for one or more transmissions on allocated resources in the first subframe to a user equipment (UE) and means for transmitting the first subframe with a second grant that allocates resources in at least a second subframe to occur after the first subframe.

Certain aspects of the present disclosure provide a non-transitory computer-readable medium for wireless communications by a base station. The non-transitory computer-readable medium generally includes instructions for transmitting a first subframe comprising a first grant that includes information for one or more transmissions on, allocated resources in the first subframe to a user equipment (UE) and transmitting a second grant, in the first subframe, that allocates resources in at least a second subframe to occur after the first subframe.

Certain aspects of the present disclosure provide a method for wireless communications by a user equipment. The method generally includes receiving, in a first subframe, a first grant that includes information for one or more transmissions on allocated resources in the first subframe to the UE and receiving, in the first subframe, a second grant that allocates resources in at least a second subframe to occur after the first subframe.

Certain aspects of the present disclosure provide an apparatus for wireless communications by a user equipment. The apparatus generally includes a receiver configure to receive, in a first subframe, a first grant that includes information for one or more transmissions on allocated resources in the first subframe and receive, in the first subframe a second grant that allocates resources in at least a second subframe to occur after the first subframe.

Certain aspects of the present disclosure provide an apparatus for wireless communications by a user equipment. The apparatus generally includes means for receiving, in a first subframe, a first grant that includes information for one or more transmissions on allocated resources in the first subframe to the UE and means for receiving, in the first subframe, a second grant that allocates resources in at least a second subframe to occur after the first subframe.

Certain aspects of the present disclosure provide a non-transitory computer-readable medium for wireless communications by a user equipment. The non-transitory computer-readable medium generally includes instructions for receiving, in a first subframe, a first grant that includes information for one or more transmissions on allocated resources in the first subframe to the UE and receiving, in the first subframe, a second grant that allocates resources in at least a second subframe to occur after the first subframe.

Aspects generally include methods, apparatus, systems, computer program products, computer-readable medium, and processing systems, as substantially described herein with reference to and as illustrated by the accompanying drawings. "LTE" refers generally to LTE, LTE-Advanced (LTE-A), LTE in an unlicensed spectrum (LTE-whitespace), etc.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 8A-8C illustrate existing dynamically-switchable subframe structures for dynamic time division duplexing (TDD), according to certain aspects of the present disclosure.

DETAILED DESCRIPTION

Figure 1:
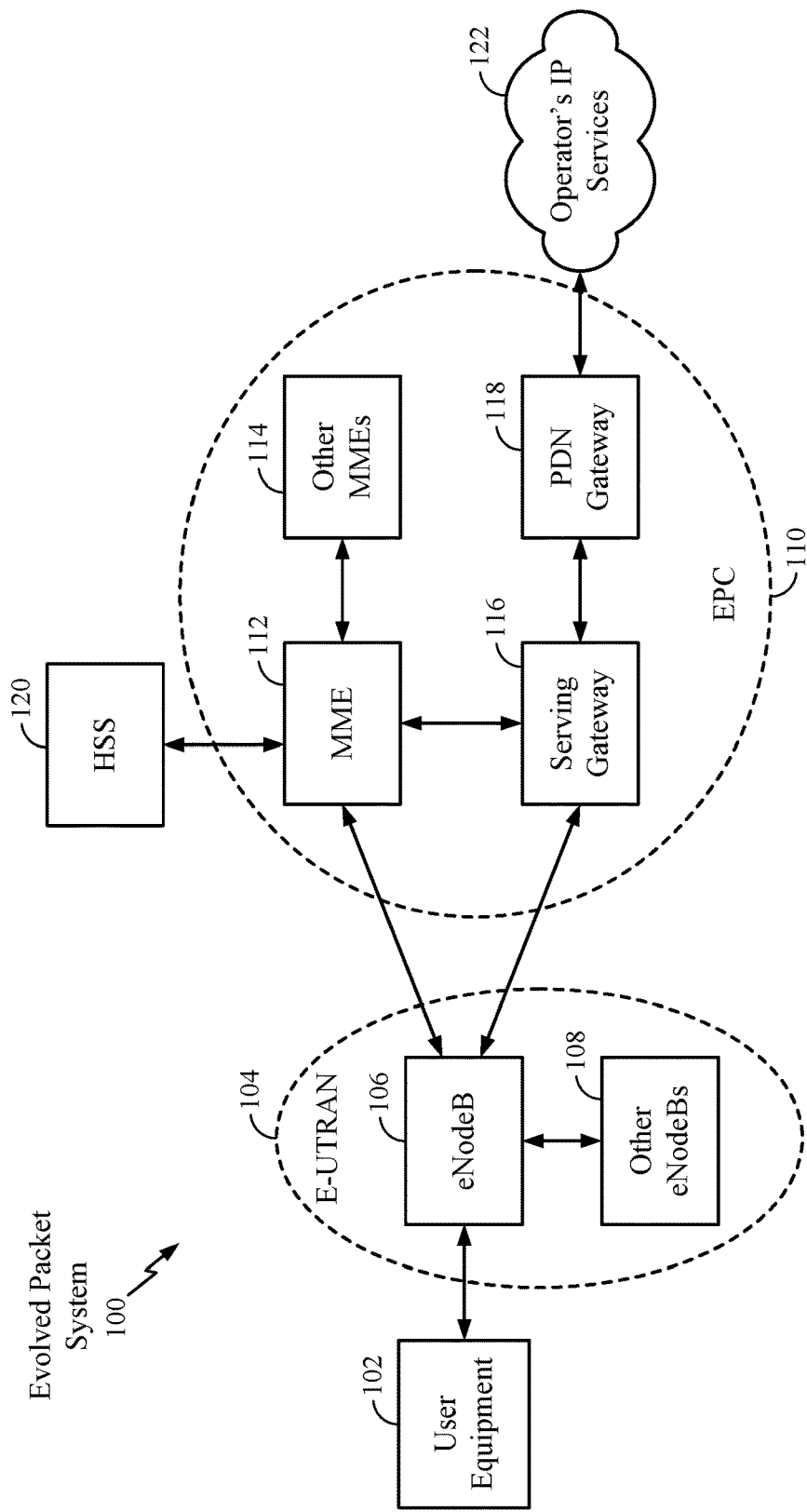
FIG. 1 is a diagram illustrating an example of a network architecture, according to certain aspects of the present disclosure.

Aspects of the present disclosure provide techniques and apparatus for alleviating timeline issues associated with grant processing in uplink (UL) centric subframes (i.e., a subframe having more uplink symbols than downlink symbols. For example, aspects of the present disclosure propose techniques for alleviating timeline issues associated with grant processing in uplink by transmitting multiple grants (e.g. two grants). A first grant that applies to a current subframe (i.e., the subframe in which it is received) and a second grant that applies to future subframes. Also, in addition certain embodiments enable and provide splitting UL grants into multiple components or portions. This can include an initial or first part configured to convey information such as rank, DMRS, and is sent N subframes before the actual UL transmission. Part A grant is needed for UE to generate DMRS and the corresponding PUSCH occurs at least one subframe later. From a first part, a UE knows exactly which subframes it is to transmit. And this can include a subsequent or second part configured to convey more dynamic resource allocation. A second part can provides modulation and coding information info for a channel (e.g., PUSCH) in a present subframe.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Example Wireless Communications System

FIG. 1 is a diagram illustrating an LTE network architecture 100 in which aspects of the present disclosure may be practiced. It should be noted that LTE is only provided for reference and that aspects of the present disclosure are not limited to LTE. For example, aspects of the present disclosure may also be practiced in other networks using technology such as LTE-Advanced, New Radio (NR), etc.

For example, a BS/evolved Node B (e.g., 106, 108, etc.) and/or UE 102 may determine, based on one or more conditions, a maximum modulation order that is supported for the transmission of control channel(s) by the eNodeB 106, 108 etc., to the UE(s) 102. As described in more detail below, the one or more conditions may be based on control information that is transmitted within the control channel(s). Referring to some examples, the eNB and/or UE may make the determination based on the particular format of the control information (e.g., which DCI format is used), a coding rate for the control information, one or more aggregation level(s) used for the control information, which search space (e.g., common search space, UE-specific search space, etc.) the control information is transmitted in, the type of identifier that is used to scramble the control information, etc.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, a drone, a robot, a sensor, a monitor, a meter, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the LTE network.

Figure 2:
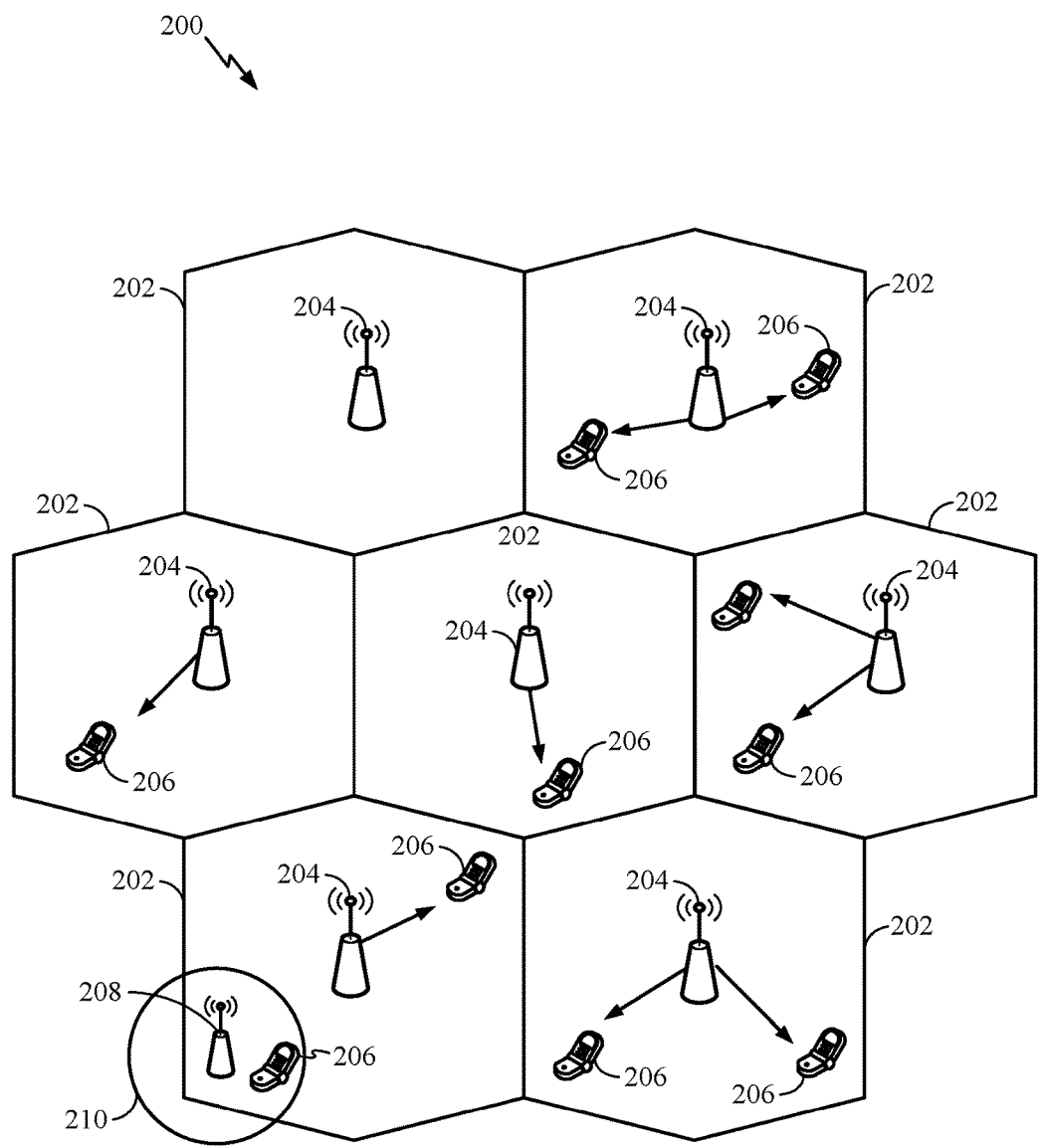
FIG. 2 is a diagram illustrating an example of an access network, according to certain aspects of the present disclosure.

FIG. 2 is a diagram illustrating an example of an access network 200 in an LTE network architecture in which aspects of the present disclosure may be practiced. As noted above, LTE is only provided for reference and aspects of the present disclosure are not limited to LTE.

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, a UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
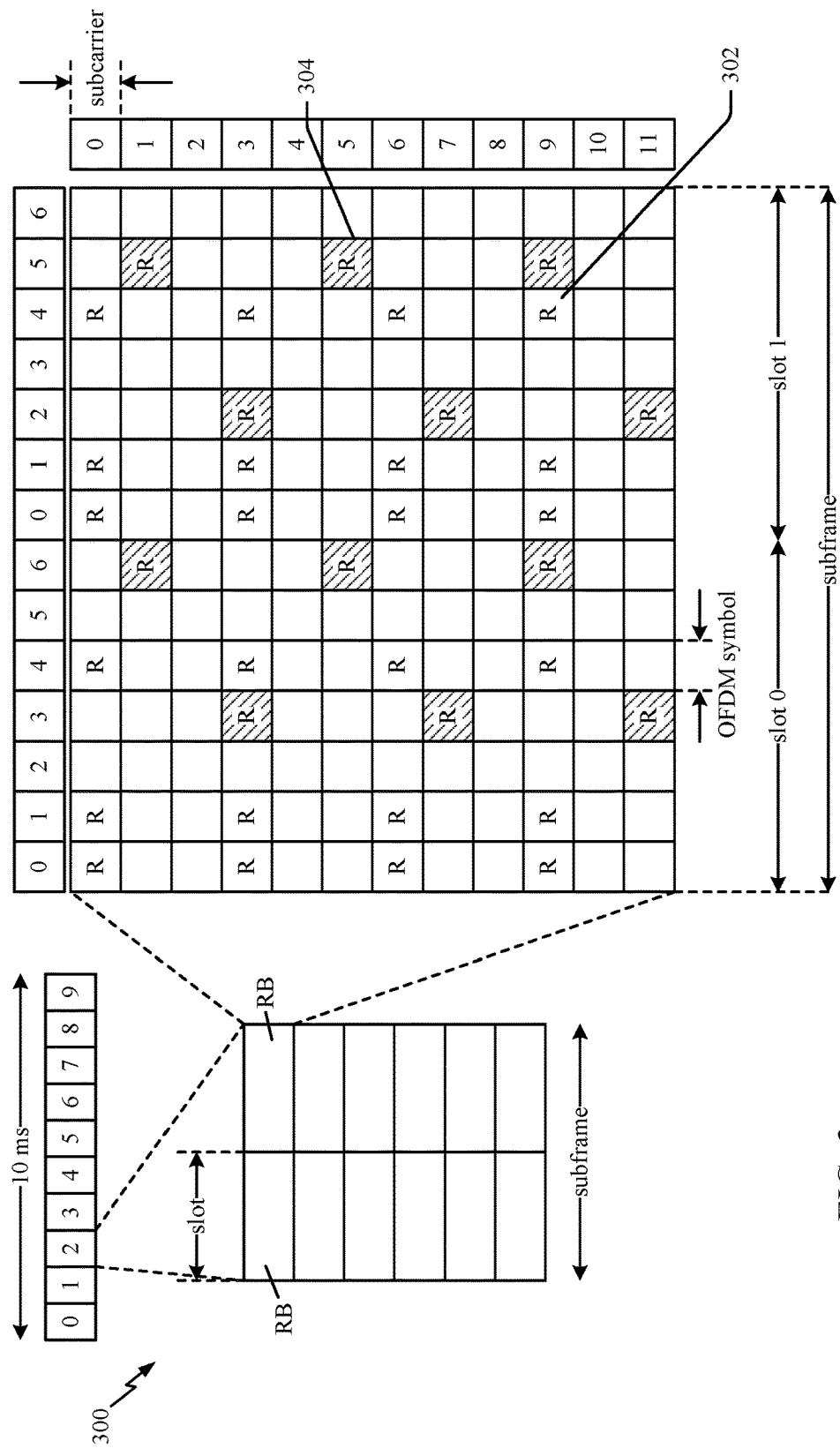
FIG. 3 is a diagram illustrating an example of a DL frame structure in LTE, according to certain aspects of the present disclosure.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. For example, the PDCCH may include downlink control information (DCI), which carries control information for both downlink and uplink transmissions, such as for example, downlink scheduling assignments, uplink scheduling grants, power control commands, information for decoding/demodulating symbols in the downlink, information for encoding/modulating symbols in the uplink, etc.

The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. REGs may further be arranged into control channel elements (CCEs). Each CCE may include nine REGs. Thus, one CCE equals 36 REs. The REGs may be distributed across one or more symbols periods (e.g., first one, two, three, etc., symbol periods) and/or the system bandwidth through interleaving.

The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2.

The PDCCH may occupy one or more CCEs. The number of CCEs in a PDCCH generally refers to the PDCCH's aggregation level. The PDCCH may use aggregation level 1, 2, 4, 8, 16, 32, etc. (corresponding to 9, 18, 36, 72, 144, 288 REGs, etc., which may be selected from the available REGs, in the first M symbol periods, for example). Only certain combinations of REGs may be allowed for the PDCCH. In aspects of the present methods and apparatus, a subframe may include more than one PDCCH.

A UE may know the specific REGs used for the PHICH and the PCFICH.

The UE may search different combinations of REGs for the PDCCH. The number of combinations to search is typically less than the number of allowed combinations for the PDCCH. An eNB may send the PDCCH to the UE in any of the combinations that the UE will search.

Figure 4:
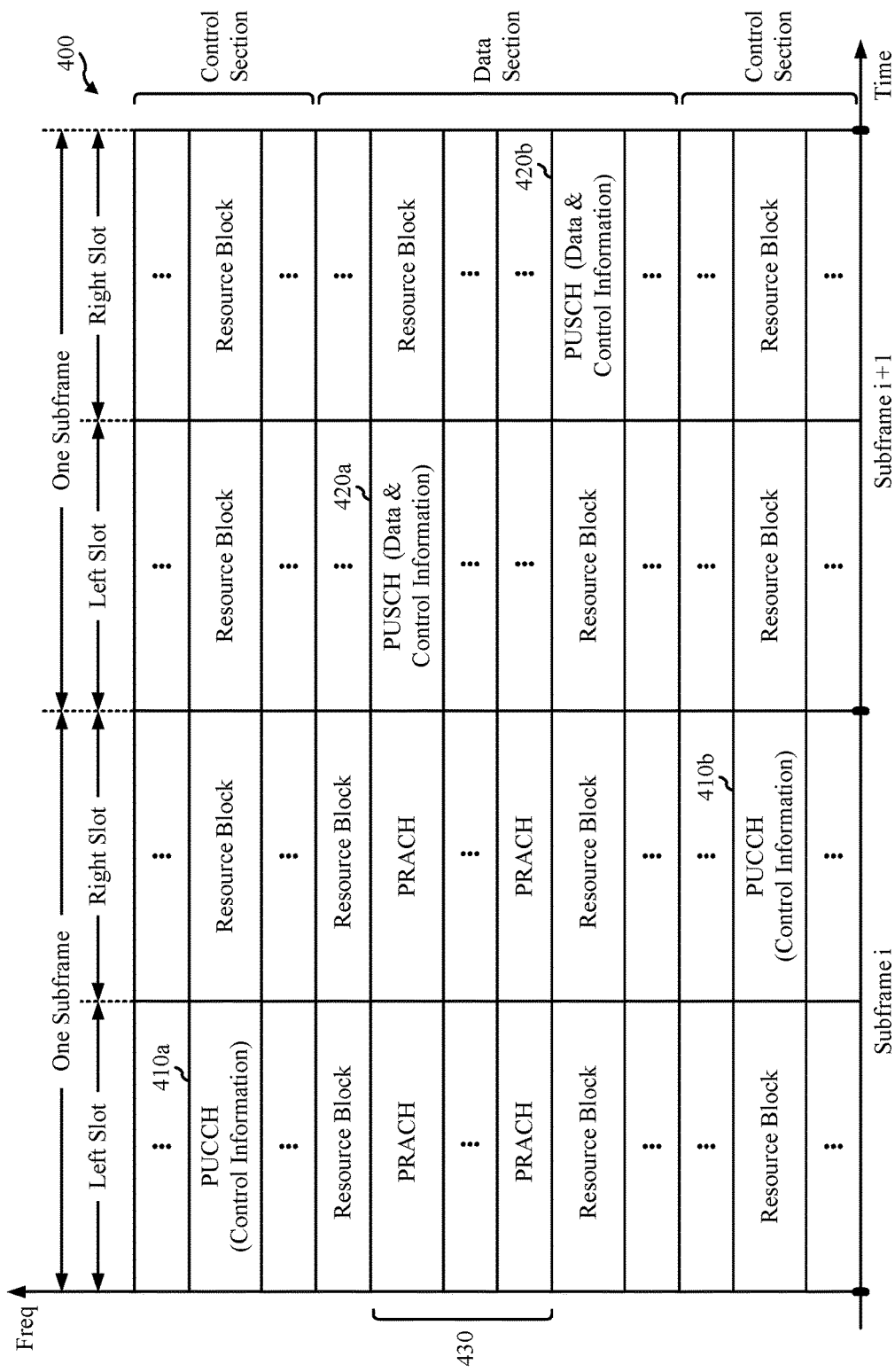
FIG. 4 is a diagram illustrating an example of an UL frame structure in LTE, according to certain aspects of the present disclosure.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
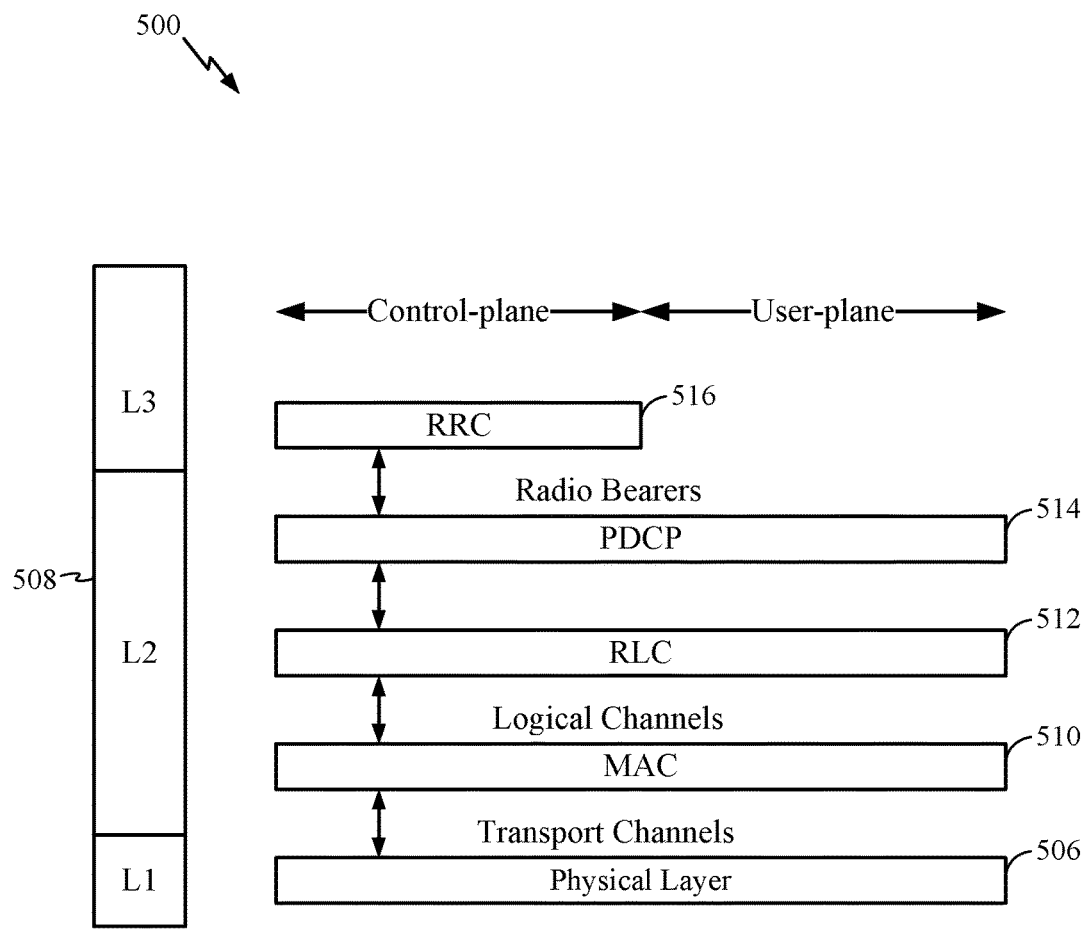
FIG. 5 is a diagram illustrating an example of a radio protocol architecture for the user and control plane, according to certain aspects of the present disclosure.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
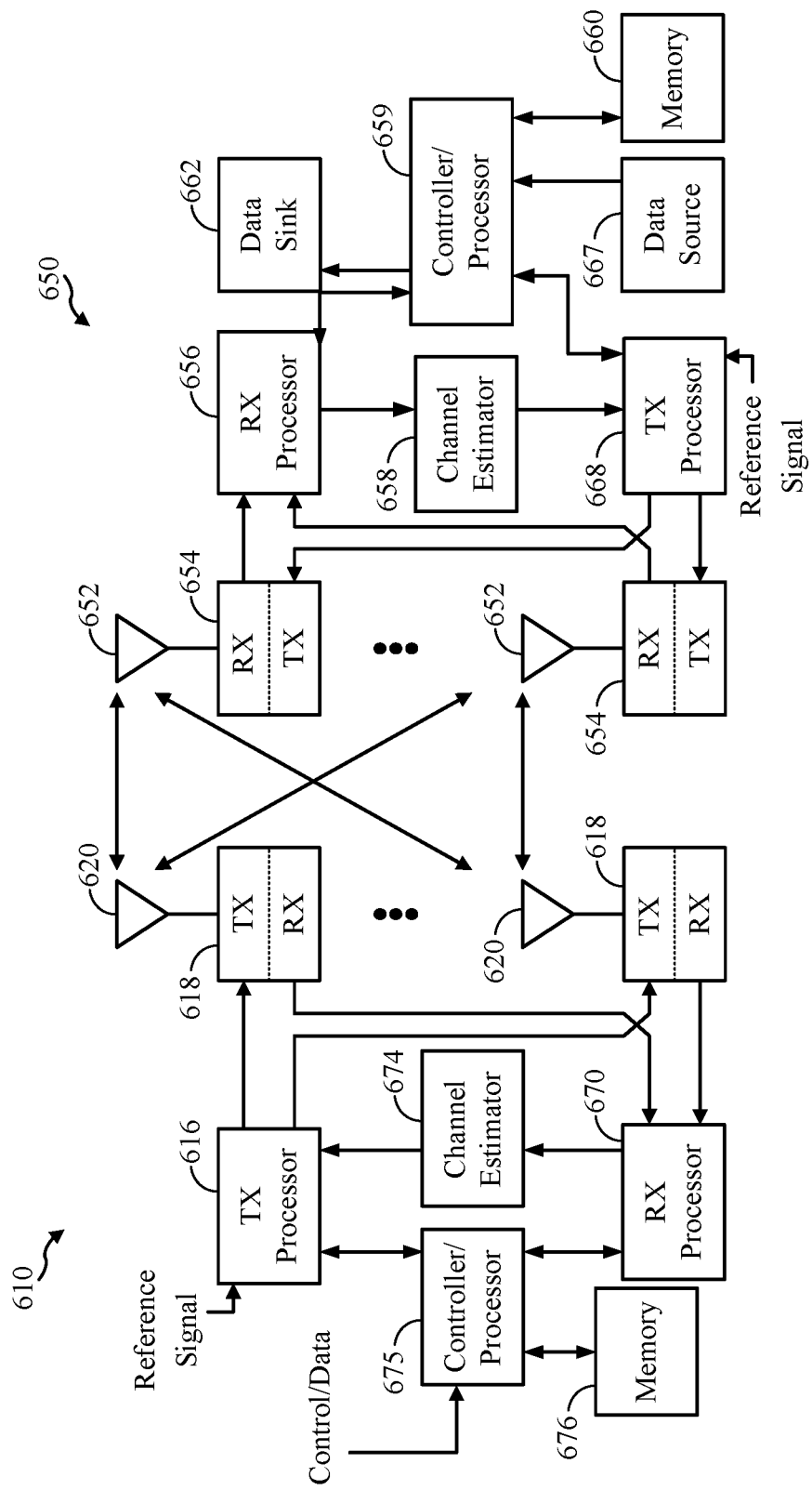
FIG. 6 is a diagram illustrating an example of an evolved Node B and user equipment in an access network, in accordance with certain aspects of the disclosure, according to certain aspects of the present disclosure.

FIG. 6 is a block diagram of an eNB 610 in communication with a UE 650 in an access network, in which aspects of the present disclosure may be practiced. In some cases, the eNB 610 may comprise the eNB 106 illustrated in FIG.

1 and/or the eNB 204 illustrated in FIG. 2. Further, in some cases, the UE 650 may comprise the UE 102 illustrated in FIG. 1 and/or the UE 206 illustrated in FIG. 2.

For example, eNB 610 and/or UE 650 may determine a maximum modulation order for the transmission of control channel(s) based on one or more conditions. Once determined, the eNB 610, for example, may select a modulation and coding scheme (MCS) with a corresponding modulation order at or below the determined maximum modulation order. The eNB 610 may select the MCS for each UE 650 based on channel quality indicators (CQIs) received from the UE 650, process (e.g., encode and modulate) the control data for each UE based on the MCS(s) selected for the UE, and transmit control information in the control channel(s) using the selected MCS(s).

Similarly, once the UE 650 determines the maximum modulation order for the eNB 610 to transmit the control channel(s), the UE 650 may monitor for the control channel(s) transmitted by the eNB 610 at a MCS at or below the determined maximum modulation order. The particular MCS used by the UE 650 may be based on one or more CQI(s) provided to the eNB 610.

Referring to the eNB 610, in the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650. Further, the controller/processor 675 may be configured to perform one or more of the operations illustrated in FIG. 10, such as generating a first grant that includes information for one or more transmissions on allocated resources in a first subframe and also generating a second grant that allocates resources in at least a second subframe to occur after the first subframe.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

In some cases, the transmitter 618TX may be configured to perform one or more of the operations illustrated in FIG. 10, such as transmitting a first grant that includes information for one or more transmissions on allocates resources in a first subframe and also transmitting a second grant that allocated resources in at least a second subframe to occur after the first subframe, as explained in greater detail below.

At the UE 650, each receiver 654RX receives a signal through its respective antenna 652. Each receiver 654RX recovers information modulated onto an RF carrier and provides the information to the receiver (RX) processor 656. For example, in some cases, the receiver 654RX may be configured to perform one or more of the operations illustrated in FIG. 11, such as receiving a first grant that includes information for one or more transmissions on allocates resources in a first subframe and also receiving a second grant that allocated resources in at least a second subframe to occur after the first subframe, as explained in greater detail below.

The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations. Additionally, in some cases, the control/processor 659 may be configured to act in a determined manner according to a first grant and a second grant received. For example, in some cases, the controller/processor 659 may be configured to transmit information (e.g., on the UL) based on the received first and second grants, as explained below.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operations at the eNB 610 and the UE 650, respectively.

Figure 10:
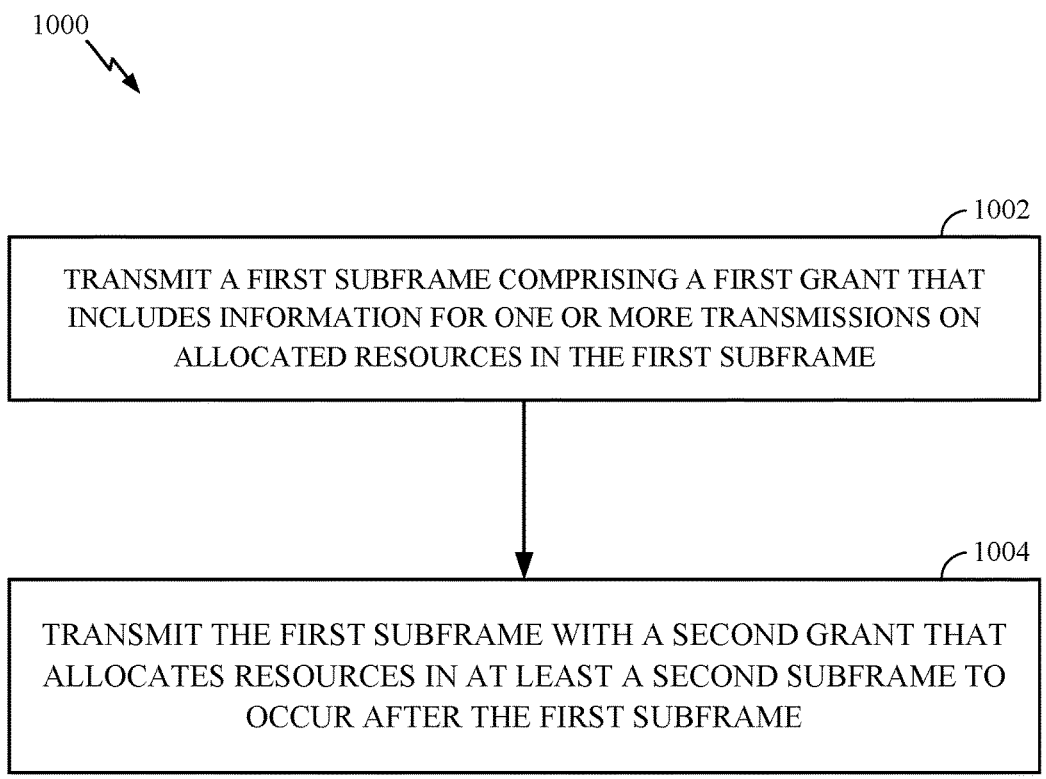
FIG. 10 illustrates example operations for a base station, according to certain aspects of the present disclosure.

The controller/processor 675 and/or other processors and modules at the eNB 610 may perform or direct operations, for example, operations 1000 in FIG. 10, and/or other processes for the techniques described herein. The controller/processor 659 and/or other processors and modules at the UE 650 may perform or direct operations, for example, operations 1100 in FIG. 11, and/or other processes for the techniques described herein. In certain aspects, one or more of any of the components shown in FIG. 6 may be employed to perform example operations 1000 and 1100 and/or other processes for the techniques described herein. The memories 660 and 676 may store data and program codes for the UE 650 and eNB 610 respectively, accessible and executable by one or more other components of the UE 650 and the eNB 610.

In wireless communication systems (e.g., such as LTE) various modulation schemes, such as BPSK, QPSK, M-PSK, M-QAM, etc., may be supported for downlink and/or uplink transmissions. LTE (Release-11 and earlier), for example, may support modulation orders up to 64 QAM. In these systems, BPSK, QPSK and 16 QAM may be supported in uplink and downlink directions, whereas 64 QAM may be supported in the downlink direction. A transmitting wireless device (e.g., BS, UE, etc.) may use a MCS field (e.g., within DCI) to indicate the modulation order to another wireless device. A five bit MCS field may be supported in both DL and UL scheduling grants (e.g., within DCI), and may provide up to twenty-nine different MCSs for efficient rate adaptation.

Based on the MCS index value indicated from the MCS field, the UE may determine the number of spatial streams, modulation type, coding rate, and data rate for a given transmission. MCS indices 0-28 may provide explicit MCS schemes and may be used for both new and re-transmissions. MCS indices 29, 30 and 31 may provide implicit MCS schemes and may be used for re-transmissions.

To enable rate adaptation, and in light of a five bit MCS, the wireless communication system may also support a four bit CQI report. For example, the UE may use the four bit CQI report to report sixteen possible channel conditions experienced by the UE. Based on the reported CQI, the eNB can schedule up to 29 possible MCS schemes for the UE. In some cases, the MCS may also be used for transport block size (TBS) lookup. For example, each MCS may be mapped to a TBS lookup index. In addition, the MCS index may be further combined with the number of assigned resource blocks for TBS lookup.

Wireless communication systems (e.g., such as LTE Release 12 (Rel-12) and beyond) may support modulation orders that are higher relative to those supported in earlier releases of LTE. For example, Rel-12 may support up to 256 QAM for downlink transmissions. Such a modulation order (e.g., 256 QAM) may be used in small cell deployments, e.g., when a UE is likely to experience very good channel conditions.

With the support for 256 QAM, new CQI, MCS, and/or TBS tables may be defined. For example, new CQI tables may be defined to support CQI feedback with 256 QAM entries. New MCS tables may be defined to support scheduling of PDSCH with 256 QAM. New TBS tables may be defined to support a larger TBS and therefore a higher peak rate. However, even with these new tables defined, the wireless communication system may associate a subset of DCI formats with legacy tables while using the new tables for the remaining DCI formats. For example, DCI format 1A/1C may be associated with the legacy MCS table (i.e., not supporting 256 QAM PDSCH scheduling) while the other DCI formats used for scheduling PDSCH may use the new MCS tables (i.e., supporting 256 QAM PDSCH scheduling). Further, in some cases, 256 QAM PDSCH scheduling may be supported for C-RNTI based PDSCH transmissions and may not be supported for SPS-RNTI based PDSCH transmissions. 256 QAM may also be supported for broadcast channels (e.g., Physical Multicast Channel (PMCH), etc.).

In some cases, UE(s) may be configured to use a combination of different CQI/MCS tables, e.g., such as a 64 QAM based CQI/MCS table and a 256 QAM based CQI/MCS table, for decoding/demodulating data channel (e.g., PDSCH) transmissions. For DL transmission modes 1 to 9, the CQI table may be dependent on the set of subframes (within a radio frame period) configured for the UE. For example, if there are two CQI subframe sets, the first set may be associated with a legacy CQI table, and the second set may be associated with a new CQI table.

In LTE, control channel(s) may be in the form of legacy control channels (e.g., PDCCH), enhanced control channels (e.g., ePDCCH), an machine-type-communication PDCCH (mPDCCH), etc. In some embodiments, e.g., in LTE Release 14 (Rel-14) certain devices may support low latency (or ultra low latency "ULL") capability, including the capability to perform certain procedures with low latency relative to devices that lack the capability (e.g., "legacy" devices). In such cases, control channel(s) for low latency operation with shortened TTI (e.g., less than 1 ms) may also be used.

As mentioned above, a BS generally notifies UEs of scheduling grants for uplink and downlink transmissions via downlink control information (DCI), which is included in the control channel(s) transmitted to UE(s). For these control channel(s), one or more search spaces may be defined, where each search space includes a set of decoding candidates with one or more aggregation levels. Each aggregation level generally represents a certain number of resource elements for the control channel transmission. For legacy PDCCH, for example, an aggregation level L may include L CCEs, where each CCE includes 36 REs. For ePDCCH, each aggregation level L may include L enhanced CCEs (eCCEs), where each eCCE includes 36 nominal REs (but some of the REs may not be available for an ePDCCH transmission). Thus, with ePDCCH, the number of actual REs for an ePDCCH transmission in one eCCE may be less than 36. For control channel(s) used with low latency operation, the aggregation level(s) may have different CCE sizes. The possible aggregation levels may include 1, 2, 4, 8, 16, 32, etc. For each aggregation level, there may be one or more decoding candidates.

A UE monitors the search spaces (e.g., common search space, UE-specific search space, etc.) in order to detect control channel(s) directed to the UE. In some cases, since the number of CCEs for each of the control channel(s) may vary and may not be signaled, a UE may attempt to blindly decode the control channel(s) in the search spaces. For each aggregation level, each UE may try to decode more than one possible candidate. For each decoding candidate, there may be one or more DCI sizes. For example, there may be one size for DCI format 1A/0, and another size for DCI format 2. For DCI associated with SIMO operation, the DCI size is typically in the range of 30-50 bits. For DCI associated with MIMO operation, the DCI size is much larger (e.g., 60 to 70 bits, or more). Therefore, the number of blind decodes may be a function of a number of decoding candidates and, for each decoding candidate, the possible DCI size(s).

Example Grant Processing

Figure 7A:
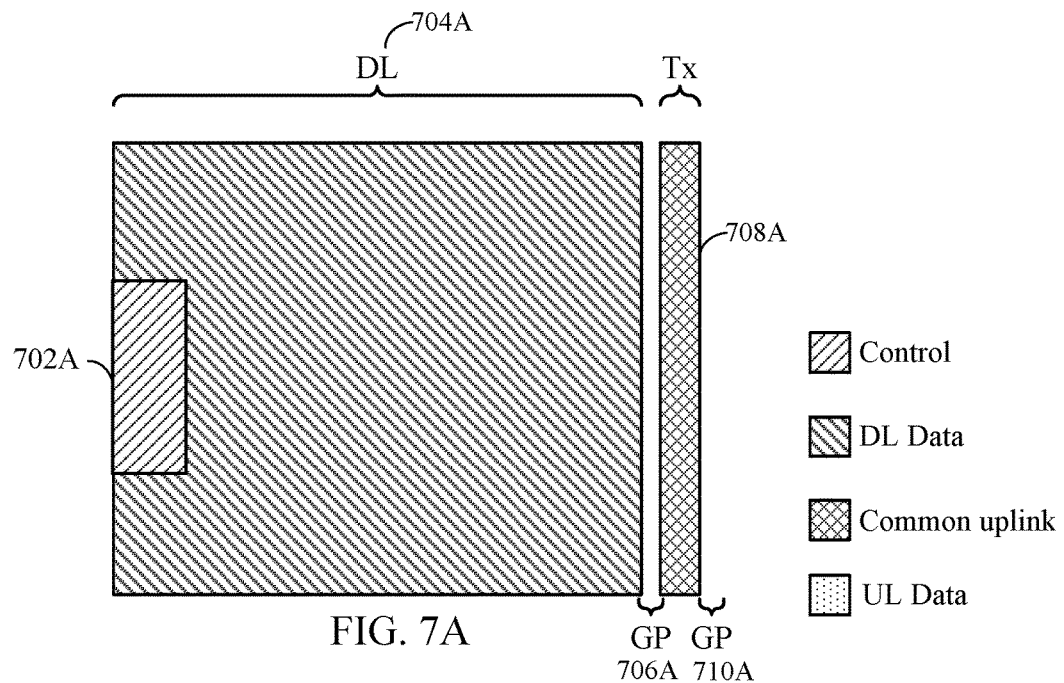
FIGS. 7A and 7B illustrate downlink centric and uplink centric subframes, according to certain aspects of the present disclosure.

FIGS. 7A/7B illustrate example downlink (DL) and uplink (UL) subframe structures. For example, FIG. 7A illustrates an example DL centric subframe structure, which, as shown, comprises control data 702A, downlink data 704A, a gap in transmission (GP) 706A, common uplink data 708A, and another gap in transmission 710A. According to certain aspects, a downlink centric subframe may be considered as a subframe having more downlink symbols than uplink symbols.

Figure 7B:
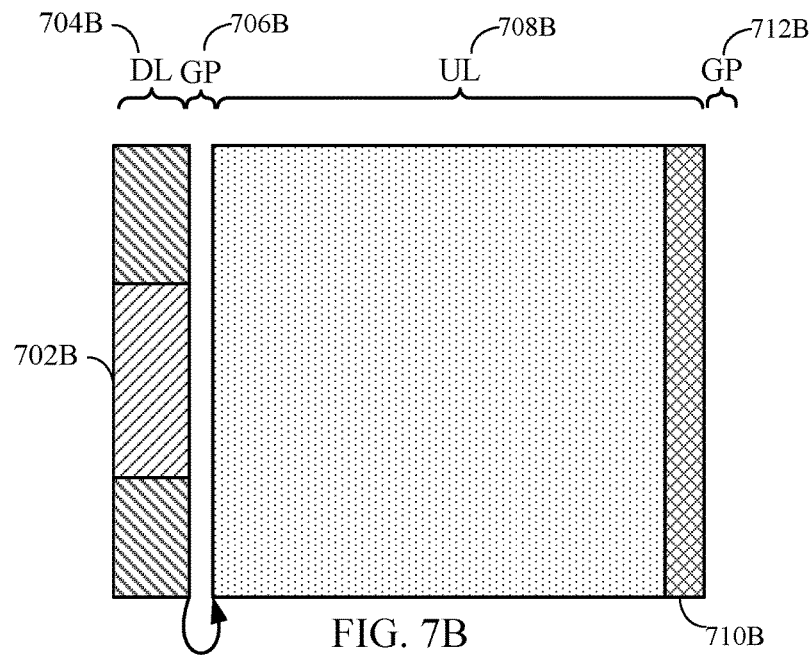

FIG. 7B illustrates an example UL centric subframe structure, which, as shown, comprises control data 702B, downlink data 704B, a gap in transmission 706B, uplink data 708B, common uplink data 710B, and another gap in transmission 712B. According to certain aspects, an uplink centric subframe may be considered as a subframe having more uplink symbols than downlink symbols. In some cases, for a UL centric subframe, a UL grant (e.g., as part of the control data 702B) is transmitted at the beginning of the UL centric subframe followed by, for example as shown in FIG. 7B, uplink data 708B based on the decoded UL grant.

FIGS. 8A-8C illustrate existing dynamically-switchable subframe structures for dynamic time division duplexing (TDD). For example, FIG. 8A illustrates a DL/UL default subframe structure, FIG. 8B illustrates a DL/UL low priority subframe structure, and FIG. 8C illustrates a DL/UL high priority subframe structure. As illustrated, the DL/UL default subframe structure shown in FIG. 8A comprises DL/UL scheduling (e.g., by the BS) 802A, a gap in transmission 804A, DL/UL clear to send (CTS) 806A, another gap in transmission 808A, DL/UL data 810A, and UL control (UE) 812A. The DL/UL low priority subframe structure illustrated in FIG. 8B comprises DL/UL scheduling (e.g., by the BS) 802B, a gap in transmission 804B, DL/UL data 806B, and UL control (UE) 808B. Additionally, the DL/UL high priority subframe structure illustrated in FIG. 8C comprises DL/UL scheduling (e.g., by the BS) 802C, a gap in transmission 804C, DL/UL override 806C, another gap in transmission 808C, DL/UL data 810C, and UL control (UE) 812C.

In some cases, it may be challenging to meet timeline requirements if the gap between an UL grant and the corresponding intended transmission (i.e., corresponding to the UL grant) is too small, which may be the case for the regular UL centric subframe (e.g., as illustrated in FIG. 7B). Additionally, for subframe structures used for dynamic TDD, there may be additional timeline challenges. For example, a user equipment (UE)/evolved node B (eNB) may need to decode the DL/UL grant during the duration of a short gap (e.g., 804A) to decide whether to transmit RTS/CTS (e.g., 806A). Additionally, the UE/eNB may need to decode the RTS/CTS (e.g., 806A) during the duration of a short gap (e.g., 808A) to decide whether to perform/receive a transmission (e.g., 810A). Aspects of the present disclosure may focus on solutions for enabling same subframe UL grant in UL centric subframes.

Figure 9A:
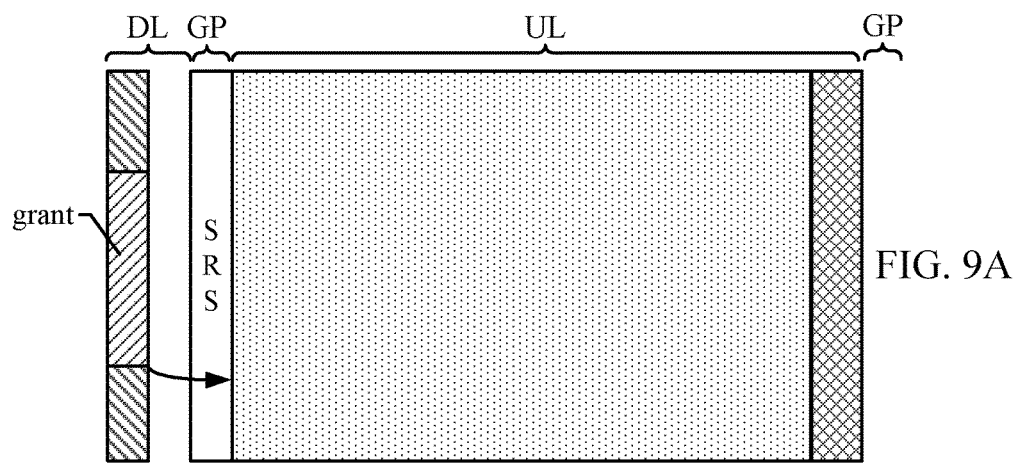
FIGS. 9A-9C illustrate some possible solutions to help alleviate the issue of timing associated with same-subframe UL grants in an UL centric subframe, according to certain aspects of the present disclosure.
Figure 9B:
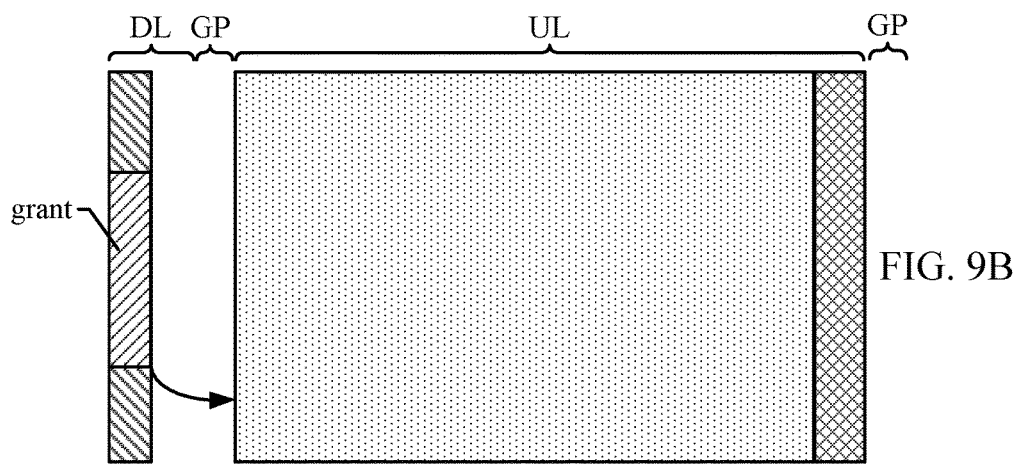
Figure 9C:
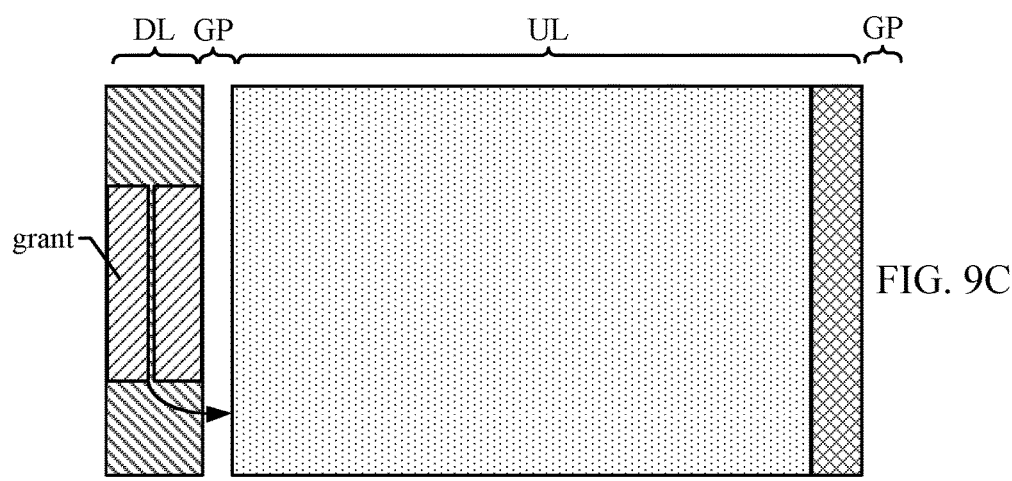

FIGS. 9A-9C illustrate possible solutions to help alleviate the issue of timing associated with same-subframe UL grants in an UL centric subframe, which may involve adding extra symbols or gaps between an UL grant and the corresponding intended transmission. For example, as illustrated in FIG. 9A, one solution may be to add (e.g., to the UL-centric subframe structure illustrated in FIG. 7B) a sounding reference symbol (SRS) before the physical uplink shared channel (PUSCH) (i.e., before the UL data). Another solution, as illustrated in FIG. 9B, may be to add a one-symbol gap between the UL grant and the corresponding intended UL transmission. Yet another solution, as illustrated in FIG. 9C, may be to use a split grant approach where resource allocation/rank information is transmitted first and (e.g., modulation and coding scheme (MCS), new data indicator (NDI), redundancy version (RV)) is transmitted after.

These solutions, however, may have some drawbacks associated with them. For example, the solution illustrated in FIG. 9A may add additional overhead if an SRS is always transmitted before the PUSCH. Likewise, the solution illustrated in FIG. 9B may add additional overhead due to one extra symbol being used for the additional gap between the UL grant and corresponding intended transmission. Similarly, the solution illustrated in FIG. 9C may add additional overhead due to two symbols being used for the UL grant in the UL centric subframe.

FIG. 10 illustrates example operations 1000 for wireless communications, for example, for helping relieve timing using associated with UL grant processing in UL centric subframes, for example, without adding additional overhead. According to certain aspects, operations 1000 may be performed by a base station (e.g., one or more of the eNBs 106, 108, 204, or 610).

Operations 1000 begin at 1002 by transmitting first subframe that includes information for one or more transmissions on allocated resources in the first subframe. At 1004, the eNB transmits the first subframe that with a second grant that allocates resources in at least a second subframe to occur after the first subframe.

Figure 11:
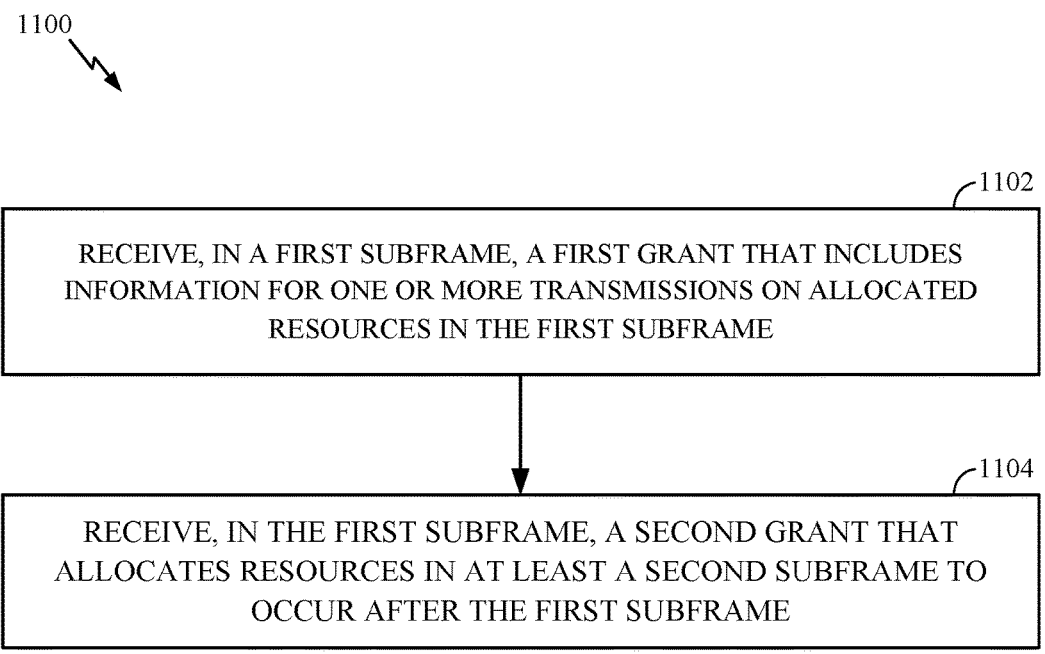
FIG. 11 illustrates example operations for a user equipment, according to certain aspects of the present disclosure.

FIG. 11 illustrates example operations 1100 for wireless communications, for example, for helping relieve timing using associated with UL grant processing in UL centric subframes. According to certain aspects, operations 1100 may be performed by a user equipment (e.g., one or more of the UEs 102, 206, or 650).

Operations 1100 begin at 1002 by receiving, in a first subframe, a first grant that includes information for one or more transmissions on allocated resources in the first subframe to the user equipment (UE). At 1004, the UE receives, in the first subframe, a second grant that allocates resources in at least a second subframe to occur after the first subframe. While not illustrated, operations 1100 may also include processing the first and second grants and performing transmissions based on the first and second grants (e.g., one or more UL transmissions).

The example operations 1000 and 1100 may overcome the drawbacks (e.g., additional overhead) associated with the solutions illustrated in FIGS. 9A-9C, for example, by extending the existing same subframe split grant approach (e.g., as illustrated in FIG. 9C) to a cross-subframe split grant approach. For example, a UL grant may be split into two grants (e.g., Grant A and Grant B). According to certain aspects, configuring the UL grant in this way alleviates issues with timing associated with same-subframe UL grants in an UL centric subframe without adding additional overhead. For example, by configuring the UL grant as two different grants, a UE may have enough time to receive and decode/process a grant (e.g., Grant A), including information indicating an allocation of subframes the UE is to perform a UL transmission, and also have enough time to receive and decode/process a grant (e.g., Grant B), including information indicating how (e.g., a MCS, NDI, RV) to perform the UL transmission, as described in greater detail below.

According to certain aspects, Grant A may be configured to include information needed to generate demodulation reference signals (DMRS) (e.g., rank information and/or a number of resource blocks) while Grant B may be configured to include scheduling information indicating how to perform a UL transmission (e.g., MSC, NDI, RV).

According to certain aspects, Grant A may be transmitted first, and, in some cases, may only be transmitted when information (e.g., information needed to generate DMRS) has changed relative to a previous transmission of Grant A. According to certain aspects, the information in Grant A may take effect in subframe n+1 or n+k where n is the current subframe number and k is any number of subframes later. Additionally, according to certain aspects, Grant A may also indicate one or more subframes in which a UE should perform an uplink transmission.

According to certain aspects and as noted above, Grant B may be transmitted after Grant A. Additionally, Grant B may be transmitted more dynamically than Grant A, similar to a regular UL grant (i.e., an uplink grant for a legacy non-UL centric subframe).

According to certain aspects, Grant A may further be configured by the eNB to include information signaling a location that a UE should expect to receive Grant B, which may help reduce the UE's search space (e.g., as noted above) and reduce the UE's processing latency. Additionally, signaling the location to receive Grant B means that, for a localized physical downlink control channel, channel estimation can be relatively localized. For example, N resource blocks (RBs) around M RBs may be used for PDCCH, where N>M. It should be noted that compared with a cross-subframe and single grant approach, the eNB has more flexibility to decide an MCS (e.g., transmitted in Grant B) right before the UE's uplink transmission, which may help improve reliability of the uplink transmission (e.g., by ensuring the correct MCS for the uplink transmission based on most recent channel conditions).

Figure 12:
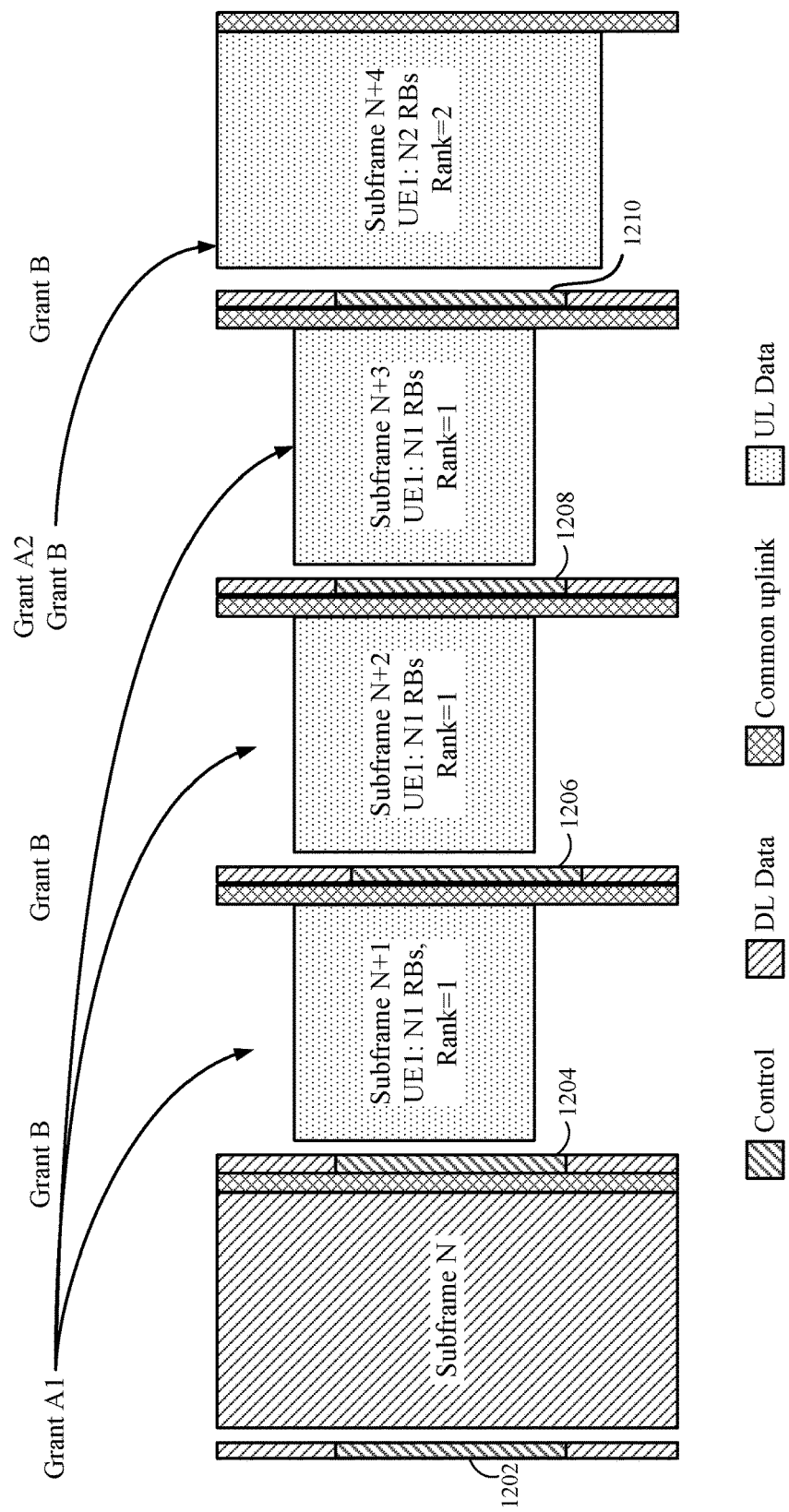
FIG. 12 illustrates an example of a cross-subframe split grant approach for UL grants, according to certain aspects of the present disclosure.

FIG. 12 illustrates an example of the cross-subframe split grant approach described above. For example, as illustrated, Grant A1 may be transmitted by the eNB in a DL centric subframe N (e.g., within control information 1202). According to certain aspects, Grant A1 may indicate to the UE that the UE has three upcoming transmissions (e.g., in subframes N+1, N+2, and N+3). Additionally, as illustrated, Grant B may be transmitted in subframe N+1 (e.g., within control information 1204) and may comprise MCS information for the UE to use while performing an UL transmission in subframe N+1. Additionally, Grant B may be transmitted in subframe N+2 (e.g., within control information 1206) and may comprise MCS information for the UE to use while performing the UL transmission in subframe N+2. Further, Grant A2 may be transmitted in UL-centric subframe N+3 (e.g., within control information 1208) in addition to Grant B. According to certain aspects, Grant B transmitted in subframe N+3 may still use the resource block (RB) allocation information indicated in Grant A1. Additionally, according to certain aspects, Grant A2 may indicate that the UE has one upcoming transmission in subframe N+4. Further, Grant B may be transmitted in subframe N+4 (e.g., within control information 1210) and may comprise MCS information for the UE to use while performing the UL transmission in subframe N+4.

Figure 13A:
FIG. 13A-13B illustrate different channels in which UL grants may be carried, according to certain aspects of the present disclosure.

According to certain aspects, Grant A and Grant B may be carried in different control channels. For example, as illustrated in FIG. 13A, Grant A may be carried in a first control channel (e.g., CC1) while Grant B may be carried in a second control channel (e.g., CC2). Providing Grant A and Grant B may be advantageous in that it allows for search space reduction for Grant B when information regarding the location of Grant B is carried in Grant A. According to certain aspects, the search space for Grant A may remain flexible.

Figure 13B:
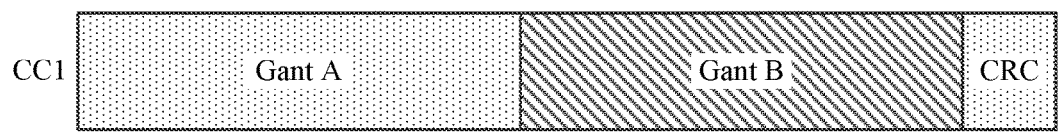

Additionally, as illustrated in FIG. 13B, Grant A and Grant B may be logically partitioned within the same control channel (e.g., CC1), reducing channel resources. According to certain aspects, a portion of the grant may be applied to a future subframe. For example, Grant A may be valid from the next upcoming UL centric subframe and Grant B may be valid for the subframe in which it is received (i.e., a current subframe) (e.g., as is the case with Grant A2 and Grant B transmitted in subframe N+3 in FIG. 12).

Figure 14:
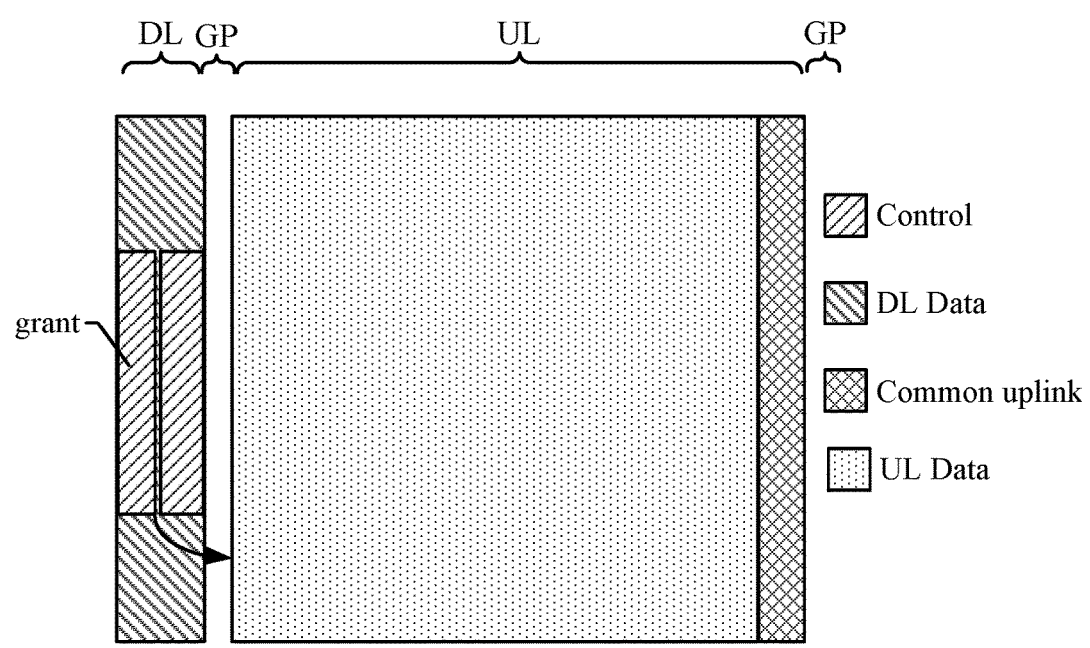
FIG. 14. illustrates that an UL grant may be applied to the subframe in which it is received, according to certain aspects of the present disclosure.

In some cases, Grant A may be also be applied to the same subframe (i.e., the subframe in which it is received) if there is additional time between the UL grant and the corresponding intended uplink transmission, for example, as illustrated in FIG. 14. According to certain aspects, the Grant A may be configured to comprise information indicating that it is to be applied to the subframe in which it is received. Additionally, according to certain aspects, the location of DMRS may be dependent on the DL portion size of the UL centric subframe. Additionally, in some cases, the search space for Grant A may need to be limited to the first symbol of the subframe to avoid timing issues associated with receiving and processing Grant A.

Figure 15:
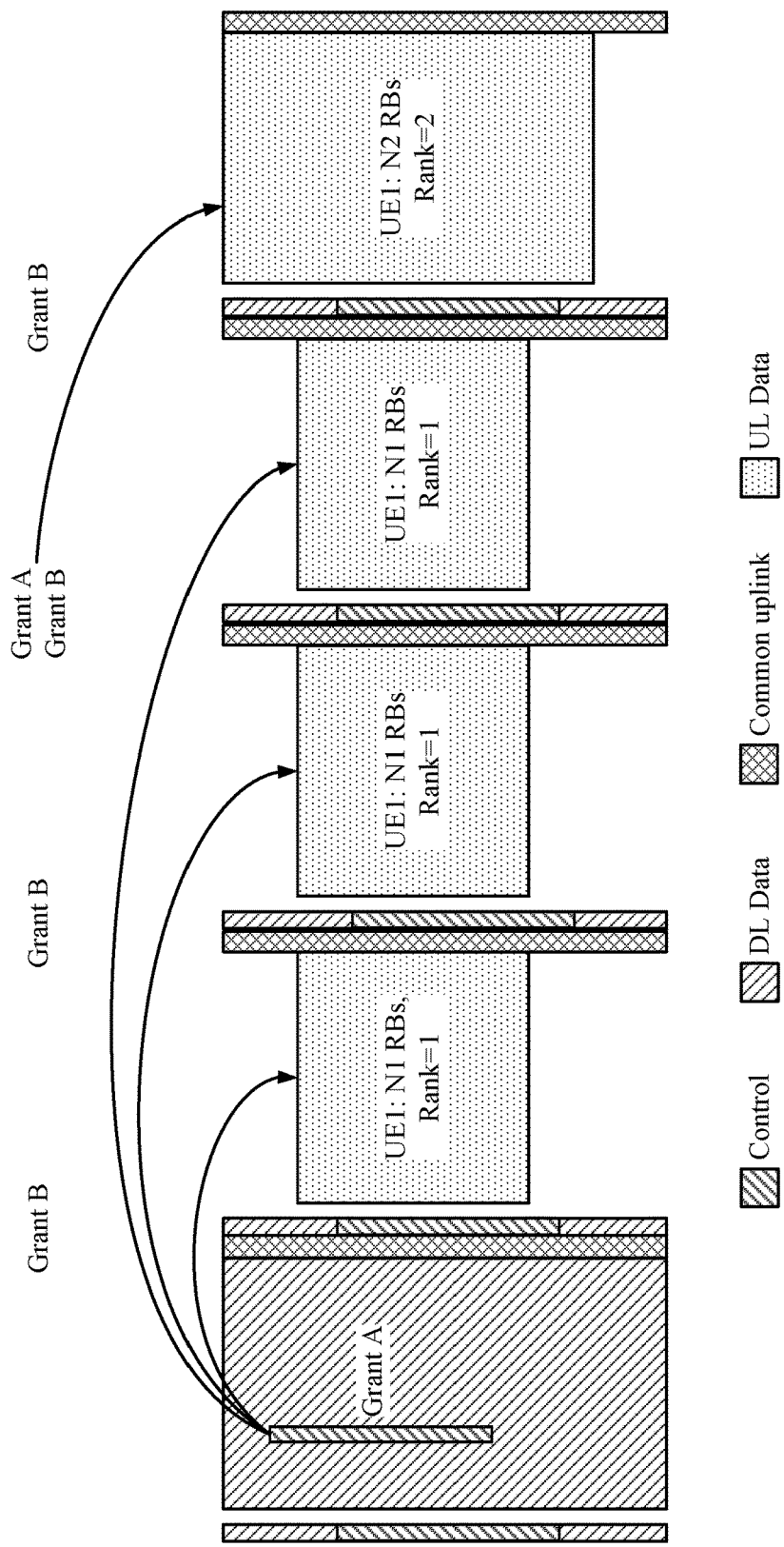
FIG. 15 illustrates transmitting an UL grant within a data portion of a DL centric subframe, according to certain aspects of the present disclosure.

In some cases, Grant A may also be transmitted (i.e., by the eNB) in a data portion of a previous subframe if the previous subframe is a DL centric subframe. For example, as illustrated in FIG. 15, Grant A may be transmitted in the data portion of the DL centric subframe N and may be applied to UL subframes N+1 to N+3. Transmitting Grant A within the data portion of a previous subframe is advantageous as it further reduces timing constraints associated with processing a UL grant in preparation for a UL transmission.

While aspects of the present disclosure may mean that some flexibility in the ability to change resources may be sacrificed and may increase error events and overhead on control resources, the solutions presented herein may be advantageous in that they allow same-subframe scheduling of PUSCH and overhead reduction of DL symbols in UL centric subframe.

It should be noted that while aspects of the present disclosure are largely directed to UL centric subframes and UL grants, the techniques presented herein may also be applied to the DL where split grants are transmitted in different subframes.

Additionally, it should be noted that while aspects of the present disclosure are generally directed to operations performed by a base station, aspects of the present disclosure may also be directed to corresponding operations performed, for example, by a user equipment.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting may comprise a transmitter, such as transmitter 618 of the eNB 610 or transmitter 654 of the UE 650, and/or one or more antennas, such as the antenna 620 of the eNB 610 or the antenna 652 of the UE 650. Means for receiving may comprise a receiver, such as receiver 618 of the eNB 610 or receiver 654 of the UE 650, and/or one or more antennas, such as the antenna 620 of the eNB 610 or the antenna 652 of the UE 650. Additionally, means for configuring may comprise a processing system, including one or more processors, such as the TX Processor 616, the RX processor 670, or the Controller/Processor 675 of the eNB 610 and/or the TX Processor 668, the RX processor 656, or the Controller/Processor 659 of the UE 650, illustrated in FIG. 6.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication, comprising:
   transmitting a first subframe comprising a first grant that includes information for one or more transmissions on allocated resources in the first subframe, wherein the first subframe comprises more uplink symbols than downlink symbols; and
   transmitting the first subframe with a second grant that allocates resources in at least a second subframe to occur after the first subframe, wherein:
      the second grant comprises information indicating an expected location to receive the first grant in at least one of the first subframe or a subsequent subframe;
      the second grant comprises information for generating a demodulation reference signal (DMRS) in the second subframe; and
      the information for generating the DMRS comprises at least a number of resource blocks for the DMRS.

2. The method of claim 1, wherein:
   the information for generating the DMRS further comprises rank information.

3. The method of claim 1, further comprising at least one of:
   configuring the second grant to comprise information indicating at least one subframe in which to perform an uplink transmission; or
   transmitting the second grant only when information in the second grant has changed relative to a previous transmission of the second grant.

4. The method of claim 1, wherein the first grant comprises information indicating a modulation and coding scheme.

5. The method of claim 1, wherein the first grant and the second grant are transmitted in different control channels.

6. The method of claim 1, wherein:
   the second grant also allocates resources in the first subframe; and
   a search space of the second grant is limited to a first symbol of the first subframe.

7. The method of claim 1, further comprising:
   configuring a third grant to comprise information for generating a reference signal in the second subframe; and
   transmitting the third grant within a data portion of a downlink subframe having more downlink symbols than uplink symbols.

8. A method of wireless communication by a user equipment (UE), comprising:
   receiving, in a first subframe comprising more uplink symbols than downlink symbols, a first grant that includes information for one or more transmissions on allocated resources in the first subframe; and
   receiving, in the first subframe a second grant that allocates resources in at least a second subframe to occur after the first subframe, wherein:
      the second grant comprises information indicating an expected location to receive the first grant in at least one of the first subframe or a subsequent subframe;
      the second grant comprises information for generating a demodulation reference signal (DMRS) in the second subframe; and the information for generating the DMRS comprises at least a number of resource blocks for the DMRS.

9. The method of claim 8, wherein:
the information for generating the DMRS further comprises rank information.

10. The method of claim 8, wherein at least one of:
the second grant comprises information indicating at least one subframe in which to perform an uplink transmission; or
the second grant is received only when information in the second grant has changed relative to a previous transmission of the second grant.

11. The method of claim 8, wherein the first grant comprises information indicating a modulation and coding scheme.

12. The method of claim 8, wherein the first grant and the second grant are received in different control channels.

13. The method of claim 8, wherein:
the second grant also allocates resources in the first subframe; and
a search space of the second grant is limited to a first symbol of the first subframe.

14. The method of claim 8, further comprising receiving a third grant within a data portion of a downlink subframe having more downlink symbols than uplink symbols, wherein the third grant comprises information for generating a reference signal in the second subframe.

15. An apparatus for wireless communication, comprising:
at least one processor configured to:
generate a first grant that includes information for one or more transmissions on allocated resources in a first subframe comprising more uplink symbols than downlink symbols;
generate a second grant that allocates resources in at least a second subframe to occur after the first subframe, wherein:
the second grant comprises information indicating an expected location to receive the first grant in at least one of the first subframe or a subsequent subframe;
the second grant comprises information for generating a demodulation reference signal (DMRS) in the second subframe; and
the information for generating the DMRS comprises at least a number of resource blocks for the DMRS; and
a transmitter configured to transmit the first grant and the second grant in the first subframe.

16. The apparatus of claim 15, wherein:
the information for generating the DMRS further comprises rank information.

17. The apparatus of claim 15, wherein at least one of:
the second grant comprises information indicating at least one subframe in which to perform an uplink transmission; or
the transmitter is further configured to transmit the second grant only when information in the second grant has changed relative to a previous transmission of the second grant.

18. The apparatus of claim 15, wherein the first grant comprises information indicating a modulation and coding scheme.

19. The apparatus of claim 15, wherein the first grant and the second grant are transmitted in different control channels.

20. The apparatus of claim 15, wherein:
the second grant also allocates resources in the first subframe; and
a search space of the second grant is limited to a first symbol of the first subframe.

21. An apparatus for wireless communications, comprising:
a receiver configured to:
receive, in a first subframe comprising more uplink symbols than downlink symbols, a first grant that includes information for one or more transmissions on allocated resources in the first subframe; and
receive, in the first subframe a second grant that allocates resources in at least a second subframe to occur after the first subframe, wherein:
the second grant comprises information indicating an expected location to receive the first grant in at least one of the first subframe or a subsequent subframe;
the second grant comprises information for generating a demodulation reference signal (DMRS) in the second subframe; and
the information for generating the DMRS comprises at least a number of resource blocks for the DMRS.

22. The apparatus of claim 21, wherein:
the information for generating the DMRS further comprises rank information.

23. The apparatus of claim 21, wherein at least one of:
the second grant comprises information indicating at least one subframe in which to perform an uplink transmission; or
the second grant is only received when the information in the second grant has changed relative to a previous transmission of the second grant.

24. The apparatus of claim 21, wherein the first grant comprises information indicating a modulation and coding scheme.

25. The apparatus of claim 21, wherein the first grant and the second grant are received in different control channels.

26. The apparatus of claim 21, wherein:
the second grant also allocates resources in the first subframe; and
a search space of the second grant is limited to a first symbol of the first subframe.

27. The apparatus of claim 21, wherein the receiver is further configured to receive a third grant within a data portion of a downlink subframe having more downlink symbols than uplink symbols, wherein the third grant comprises information for generating a reference signal in the second subframe.

* * * * *